United States Patent
Chang et al.

(10) Patent No.: US 10,797,771 B2
(45) Date of Patent: Oct. 6, 2020

(54) REFERENCE SIGNAL FOR RECEIVE BEAM REFINEMENT IN CELLULAR SYSTEMS

(71) Applicant: Apple Inc., Cupertino, CA (US)

(72) Inventors: Wenting Chang, Beijing (CN); Yushu Zhang, Beijing (CN); Yuan Zhu, Beijing (CN); Huaning Niu, Milpitas, CA (US); Jong-Kae Fwu, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 77 days.

(21) Appl. No.: 15/752,764

(22) PCT Filed: Apr. 1, 2016

(86) PCT No.: PCT/US2016/025622
§ 371 (c)(1),
(2) Date: Feb. 14, 2018

(87) PCT Pub. No.: WO2017/074497
PCT Pub. Date: May 4, 2017

(65) Prior Publication Data
US 2019/0007116 A1    Jan. 3, 2019

Related U.S. Application Data

(60) Provisional application No. 62/246,402, filed on Oct. 26, 2015.

(51) Int. Cl.
*H04W 72/04* (2009.01)
*H04B 7/06* (2006.01)
*H04L 5/00* (2006.01)

(52) U.S. Cl.
CPC ......... *H04B 7/0617* (2013.01); *H04B 7/0619* (2013.01); *H04B 7/0684* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2013/0040682 A1*  2/2013  Chang ............... H01Q 1/243
                                                    342/368
2013/0201848 A1*  8/2013  Kazmi ................ H04W 24/00
                                                    370/252

(Continued)

FOREIGN PATENT DOCUMENTS

TW         201724776 A      7/2017

OTHER PUBLICATIONS

"International Application Serial No. PCT/US2016/025622, International Search Report dated Jul. 26, 2016", 3 pgs.

(Continued)

*Primary Examiner* — Hassan A Phillips
*Assistant Examiner* — Prenell P Jones
(74) *Attorney, Agent, or Firm* — Kowert, Hood, Munyon, Rankin & Goetzel, P.C.

(57) ABSTRACT

User Equipment (UE) and base station (eNB) apparatus and methodology for adjusting receive beamforming. A beam refinement reference signal (BRRS) is transmitted with the same transmit beam direction on which data is to be transmitted. While receiving the BRRS, the receiver varies its receive beam direction and measures a signal characteristic of reception of the BRRS to determine a refined receive beam direction. The refined receive beam direction is used to receive the data.

30 Claims, 9 Drawing Sheets

(52) U.S. Cl.
CPC ........... *H04B 7/0695* (2013.01); *H04L 5/005* (2013.01); *H04L 5/0048* (2013.01); *H04L 5/0051* (2013.01); *H04L 5/0057* (2013.01)

(56) References Cited

U.S. PATENT DOCUMENTS

| | | | |
|---|---|---|---|
| 2014/0056243 A1* | 2/2014 | Pelletier | H04W 74/04 370/329 |
| 2014/0211731 A1* | 7/2014 | Inoue | H04B 7/0456 370/329 |
| 2014/0348109 A1 | 11/2014 | Chen et al. | |
| 2015/0200755 A1 | 7/2015 | Hammarwall et al. | |
| 2015/0289281 A1 | 10/2015 | Kim et al. | |
| 2016/0338138 A1* | 11/2016 | Pelletier | H04W 74/04 |
| 2018/0115357 A1* | 4/2018 | Park | H04B 7/04 |
| 2018/0176810 A1* | 6/2018 | Thangarasa | H04W 76/11 |

OTHER PUBLICATIONS

"International Application Serial No. PCT/US2016/025622, Written Opinion dated Jul. 26, 2016", 8 pgs.

* cited by examiner

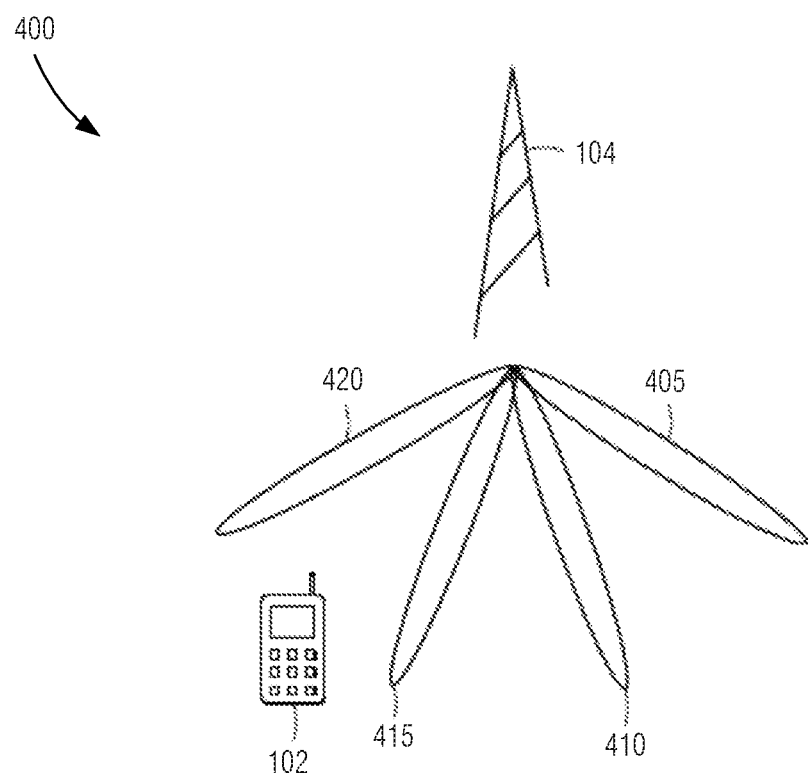
FIG. 4
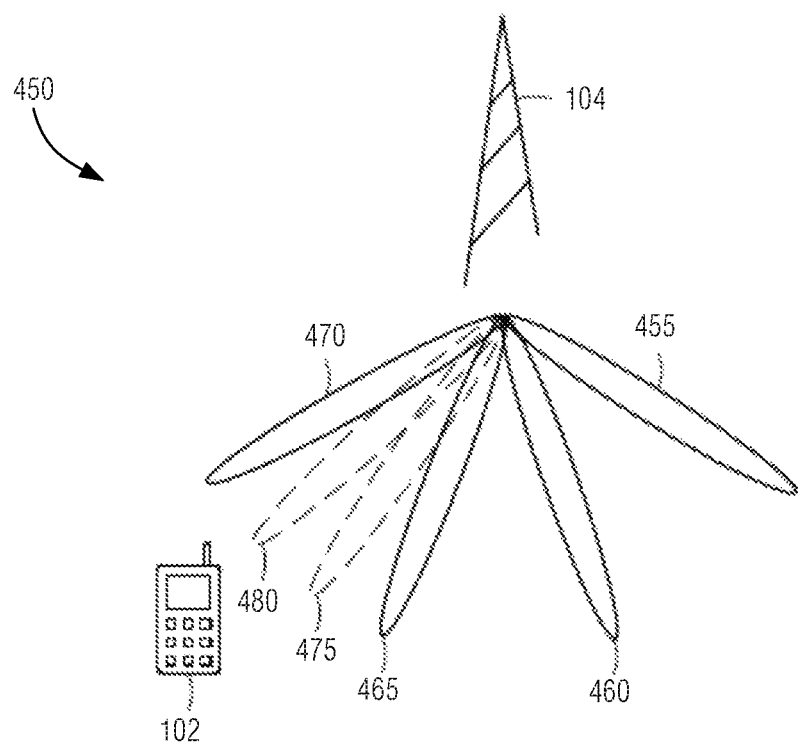

REFERENCE SIGNAL FOR RECEIVE BEAM REFINEMENT IN CELLULAR SYSTEMS

PRIORITY CLAIM

This Application is a U.S. National Stage Application under 35 U.S.C. 371 from International Application Serial No. PCT/US2016/025622, filed Apr. 1, 2016, which claims the benefit of U.S. Provisional Application No. 62/246,402, filed Oct. 26, 2015, and entitled "BEAM REFINEMENT REFERENCE SIGNAL DESIGN FOR RECEPTION OF BEAMFORMING," the disclosures of which [is] are incorporated by reference herein in their entirety.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and 5G networks, although the scope of the embodiments is not limited in this respect. Some embodiments are directed to improving the reception of directed beams by user equipment (UE) or other signal-receiving devices.

BACKGROUND

Over the last several years, cellular communication have developed from low-data-rate voice and text-messaging applications to high-data-rate applications, such as high definition (HD) audio and video streaming, full-featured Internet connectivity, with myriad useful applications, all of which have made a significant impact on the public's daily lives. Fifth generation (5G) wireless systems are forthcoming, and are expected to enable even greater speed, connectivity, and usability.

One area of development for 5G systems is high-frequency-band communication, which offers greater communication bandwidth for higher data rates than is currently available. However, one downside of high-frequency-band communication is that shorter wavelengths tend to propagate in a more line-of-sight fashion, and may be more susceptible to path loss due to obstructions, such as natural topography, trees, buildings and other structures, and vehicles, for example. To address these challenges, the utilization of beamforming and multiple-input, multiple-output (MIMO) techniques have been proposed. Beamforming may be performed on the transmit (Tx) and receive (Rx) side of the communications, and is designed to enhance the directionality of the transmission and reception of wireless signals in order to increase the gain of the communication system.

In order to achieve beam forming gain at both, the Tx, and Rx, sides, a beam reference signal (BRS) has been proposed to help identify the best Tx/Rx beam-formed pair. However, BRS is a broadcasted signal, and is transmitted with a defined periodicity to traverse all Tx beams. Sometimes, the UE is relegated to waiting until the next BRS subframe before the Rx beam can be adjusted, which may not be fast enough for effective Rx-beam refinement.

A practical solution is needed for improved beam-forming operations to address these, and other, challenges.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the following figures of the accompanying drawings.

FIG. 4 illustrates examples of multiple beam transmission in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
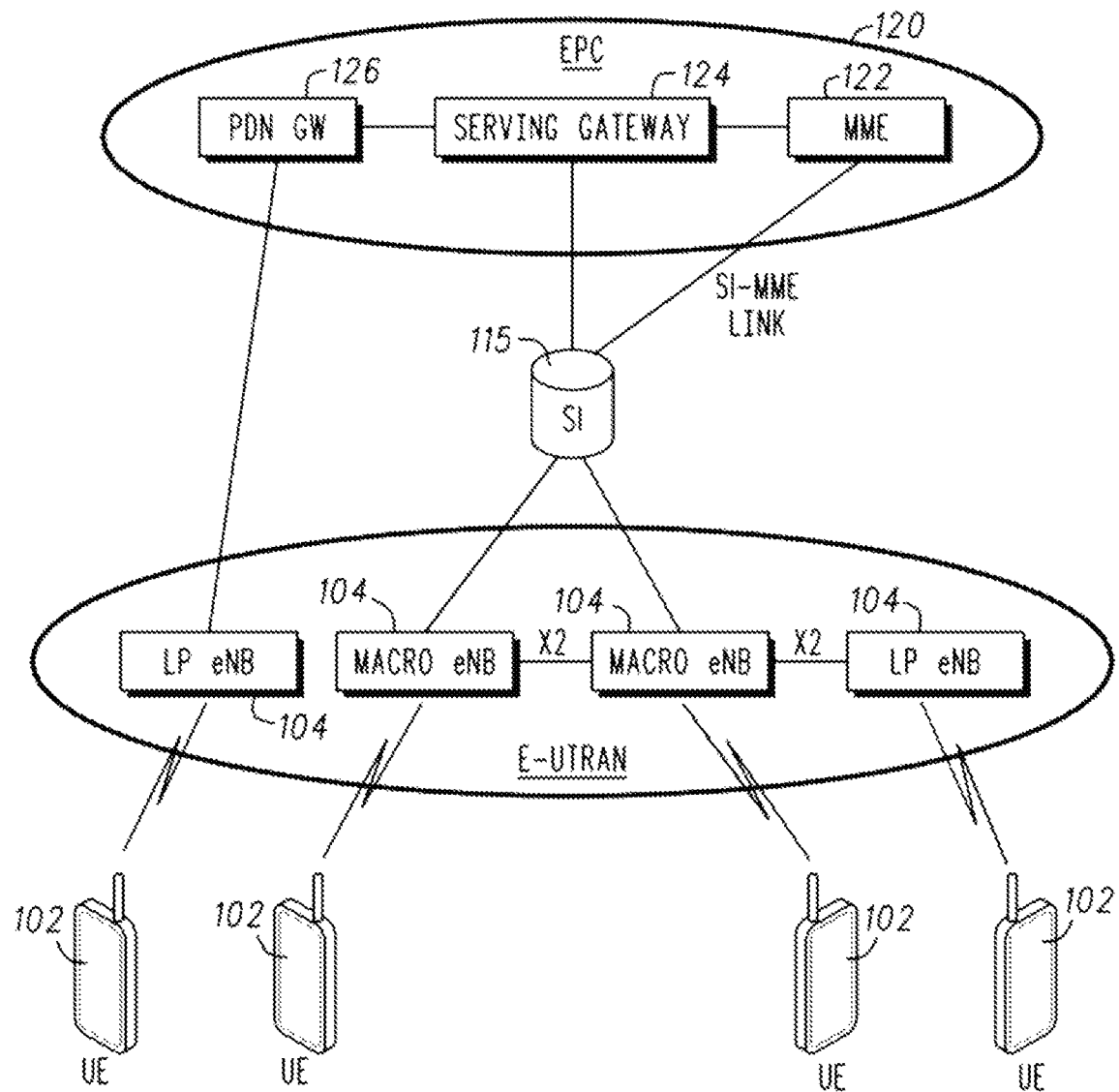
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity sake, only a portion of the core network 120, as well as the RAN 101, is shown.

The core network 120 includes a mobility management entity (MME) 122, a serving gateway (serving GW) 124, and packet data network gateway (PDN GW) 126. The RAN 101 includes Evolved Node-B's (eNBs) 104 (which may operate as base stations) for communicating with User Equipment (UE) 102. The eNBs 104 may include macro eNBs and low power (LP) eNBs. In accordance with some embodiments, the eNB 104 may transmit a downlink control message to the UE 102 to indicate an allocation of physical uplink control channel (PUCCH) channel resources. The UE 102 may receive the downlink control message from the eNB 104, and may transmit an uplink control message to the eNB 104 in at least a portion of the PUCCH channel resources. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 101 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of downlink control information (DCI) and the channel condition. There may be four or more different PDCCH formats defined in LTE with different numbers of CCEs (e.g., aggregation level, L=1, 2, 4, or 8).

As used herein, the term circuitry may refer to, be part of, or include an Application Specific Integrated Circuit (ASIC), an electronic circuit, a processor (shared, dedicated, or group), or memory (shared, dedicated, or group) that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware or software.

Figure 2:
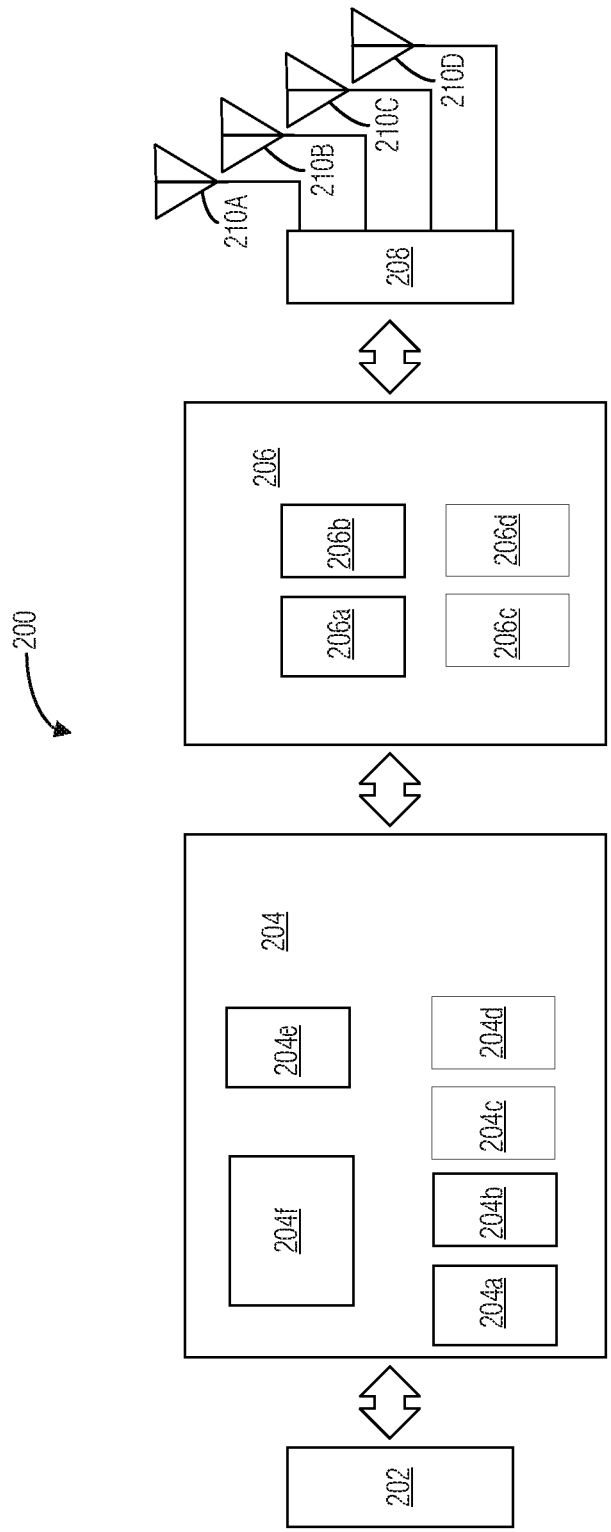
FIG. 2 is a block diagram of a User Equipment (UE) in accordance with some embodiments.

FIG. 2 is a functional diagram of a User Equipment (UE) in accordance with some embodiments. The UE 200 may be suitable for use as a UE 102 as depicted in FIG. 1. In some embodiments, the UE 200 may include application circuitry 202, baseband circuitry 204, Radio Frequency (RF) circuitry 206, front-end module (FEM) circuitry 208 and multiple antennas 210A-210D, coupled together at least as shown. In some embodiments, other circuitry or arrangements may include one or more elements or components of the application circuitry 202, the baseband circuitry 204, the RF circuitry 206 or the FEM circuitry 208, and may also include other elements or components in some cases. As an example, "processing circuitry" may include one or more elements or components, some or all of which may be included in the application circuitry 202 or the baseband circuitry 204. As another example, "transceiver circuitry" may include one or more elements or components, some or all of which may be included in the RF circuitry 206 or the FEM circuitry 208. These examples are not limiting, however, as the processing circuitry or the transceiver circuitry may also include other elements or components in some cases.

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the system.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), or radio resource control (RRC) elements. A central processing unit (CPU) 204e of the baseband circuitry 204 may be configured to run elements of the protocol stack for signaling of the PHY, MAC, RLC, PDCP or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect. In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206. In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider. The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer. In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more of the antennas 210A-D, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210A-D.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210. In some embodiments, the UE 200 may include additional elements such as, for example, memory/storage, display, camera, sensor, or input/output (I/O) interface.

Figure 3:
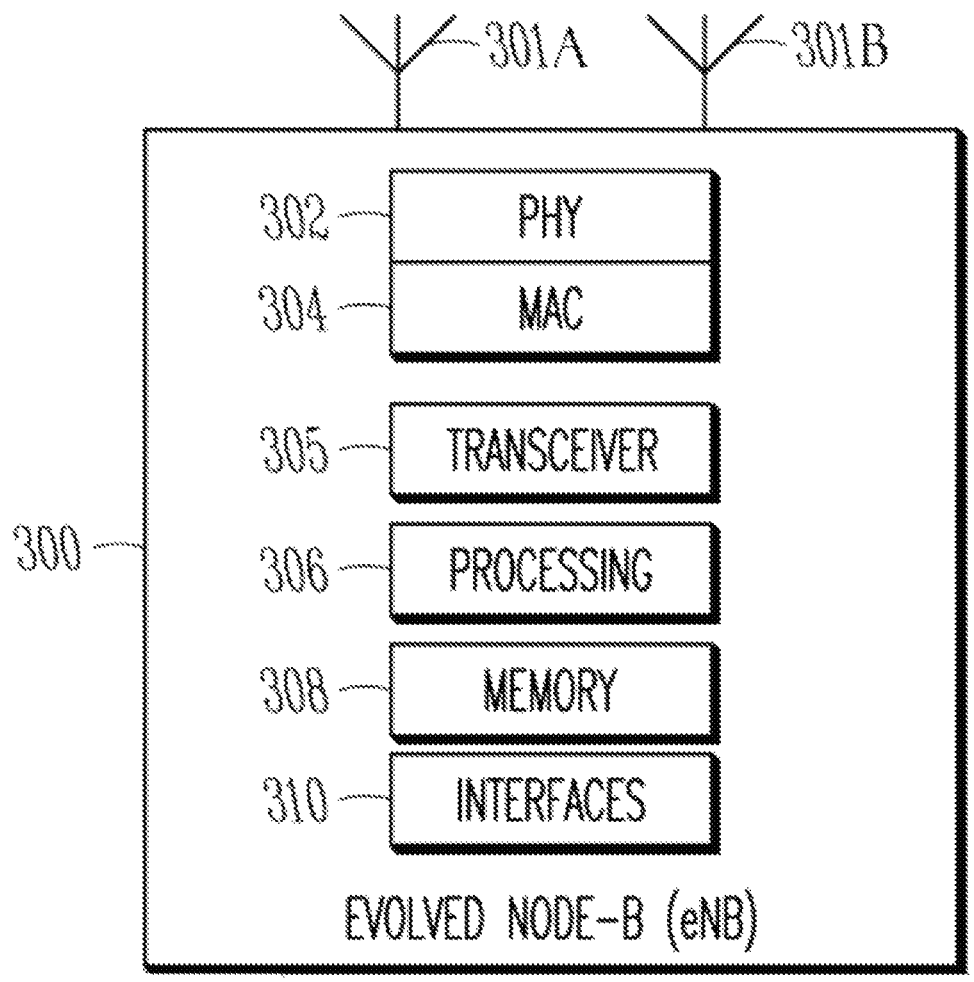
FIG. 3 is a block diagram of an Evolved Node-B (eNB) in accordance with some embodiments.

FIG. 3 is a functional diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The components of eNB 300 may be included in a single device or a plurality of devices. The eNB 300 may include physical layer circuitry 302 and a transceiver 305, one or both of which may enable transmission and reception of signals to and from the UE 200, other eNBs, other UEs or other devices using one or more antennas 301A-B. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 210A-D, 301A-B may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210A-D, 301A-B may be effectively separated to take advantage of spatial diversity and the different channel characteristics that may result.

In some embodiments, the UE 200 or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive or transmit information wirelessly. In some embodiments, the UE 200 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 200, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB 300 are each illustrated as having several separate functional elements, one or more of the functional elements may be combined and may be implemented by combinations of software-configured elements, such as processing elements including digital signal processors (DSPs), or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 200 or eNB 300 may include various components of the UE 200 or the eNB 300 as shown in FIGS. 2-3. Accordingly, techniques and operations described herein that refer to the UE 200 (or 102) may be applicable to an apparatus for a UE. In addition, techniques and operations described herein that refer to the eNB 300 (or 104) may be applicable to an apparatus for an eNB.

FIG. 4 illustrates examples of multiple beam transmission in accordance with some embodiments. Although the example scenarios 400 and 450 depicted in FIG. 4 may illustrate some aspects of techniques disclosed herein, it will be understood that embodiments are not limited by example scenarios 400 and 450. Embodiments are not limited to the number or type of components shown in FIG. 4 and are also not limited to the number or arrangement of transmitted beams shown in FIG. 4.

In example scenario 400, the eNB 104 may transmit a signal on multiple beams 405-420, any or all of which may be received at the UE 102. It should be noted that the number of beams or transmission angles as shown are not limiting. As the beams 405-420 may be directional, transmitted energy from the beams 405-420 may be concentrated in the direction shown. Therefore, the UE 102 may not necessarily receive a significant amount of energy from beams 405 and 410 in some cases, due to the relative location of the UE 102.

UE 102 may receive a significant amount of energy from the beams 415 and 420 as shown. As an example, the beams 405-420 may be transmitted using different reference signals, and the UE 102 may determine channel-state information (CSI) feedback or other information for beams 415 and 420. In some embodiments, each of beams 405-420 are configured as CSI reference signals (CSI-RS). In related embodiments, the CSI-RS signal is a part of the discovery reference signaling (DRS) configuration. The DRS configuration may serve to inform the UE 102 about the physical resources (e.g., subframes, subcarriers) on which the CSI-RS signal will be found. In related embodiments, the UE 102 is further informed about any scrambling sequences that are to be applied for CSI-RS.

In some embodiments, up to 2 MIMO layers may be transmitted within each beam by using different polarizations. More than 2 MIMO layers may be transmitted by using multiple beams. In related embodiments, the UE is configured to discover the available beams and report those discovered beams to the eNB prior to the MIMO data transmissions using suitable reporting messaging, such as channel-state reports (CSR), for example. Based on the reporting messaging, the eNB 104 may determine suitable beam directions for the MIMO layers to be used for data communications with the UE 102. In various embodiments, there may be up to 2, 4, 8, 16, 32, or more MIMO layers, depending on the number of MIMO layers that are supported by the eNB 104 and UE 102. In a given scenario, the number of MIMO layers that may actually be used will depend on the quality of the signaling received at the UE 102, and the availability of reflected beams arriving at diverse angles at the UE 102 such that the UE 102 may discriminate the data carried on the separate beams.

In the example scenario 450, the UE 102 may determine angles or other information (such as CSI feedback, channel-quality indicator (CQI) or other) for the beams 465 and 470. The UE 102 may also determine such information when received at other angles, such as the illustrated beams 475 and 480. The beams 475 and 480 are demarcated using a dotted line configuration to indicate that they may not necessarily be transmitted at those angles, but that the UE 102 may determine the beam directions of beams 475 and 480 using such techniques as receive beam-forming, as receive directions. This situation may occur, for example, when a transmitted beam reflects from an object in the vicinity of the UE 102, and arrives at the UE 102 according to its reflected, rather than incident, angle.

In some embodiments, the UE 102 may transmit one or more channel state information (CSI) messages to the eNB 104 as reporting messaging. Embodiments are not limited to dedicated CSI messaging, however, as the UE 102 may include relevant reporting information in control messages or other types of messages that may or may not be dedicated for communication of the CSI-type information.

As an example, the first signal received from the first eNB 104 may include a first directional beam based at least partly on a first CSI-RS signal and a second directional beam based at least partly on a second CSI-RS signal. The UE 102 may determine a rank indicator (RI) for the first CSI-RS and an RI for the second CSI-RS, and may transmit both RIs in the CSI messages. In addition, the UE 102 may determine one or more RIs for the second signal, and may also include them in the CSI messages in some cases. In some embodiments, the UE 102 may also determine a CQI, a precoding matrix indicator (PMI), receive angles or other information for one or both of the first and second signals. Such information may be included, along with one or more RIs, in the one or more CSI messages. In some embodiments, the UE 102 performs reference signal receive power (RSRP) measurement, received signal strength indication (RSSI) measurement, reference signal receive quality (RSRQ) measurement, or some combination of these using CSI-RS signals.

Figure 5:
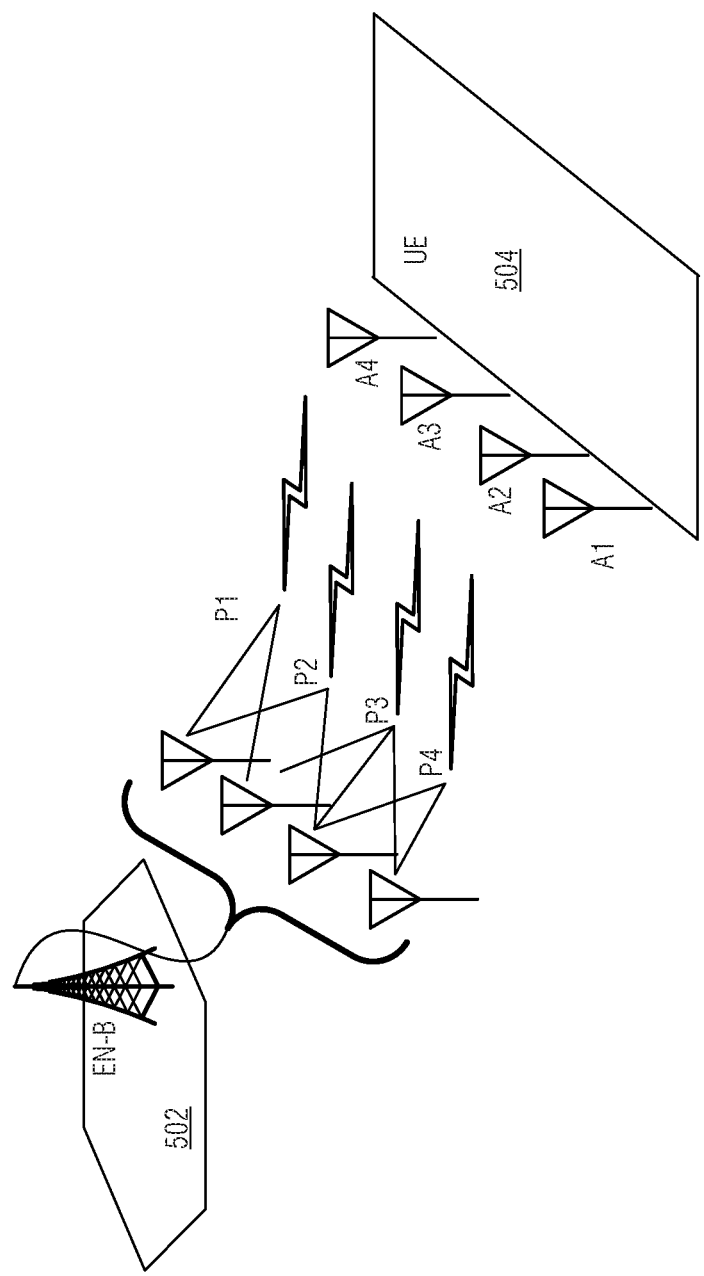
FIG. 5 is a diagram illustrating a MIMO transmission scenario utilizing an eNB and a UE, each having multiple antennas according to some embodiments.

FIG. 5 is a diagram illustrating a MIMO transmission scenario utilizing an eNB and a UE, each having multiple antennas according to some embodiments. eNB 502 has multiple antennas, as depicted, which may be used in various groupings, and with various signal modifications for each grouping, to effectively produce a plurality of antenna ports P1-P4. In various embodiments within the framework of the illustrated example, each antenna port P1-P4 may be defined for 1, 2, 3, or 4 antennas. Each antenna port P1-P4 may correspond to a different transmission signal direction. Using the different antenna ports, eNB 502 may transmit multiple layers with codebook-based or non-codebook-based precoding techniques. According to some embodiments, each antenna port corresponds to a beam antenna port-specific CSI-RS signals are transmitted at via respective antenna port. In other embodiments, there may be more, or fewer, antenna ports available at the eNB than the four antenna ports as illustrated in FIG. 5.

On the UE side, there are a plurality of receive antennas. As illustrated in the example of FIG. 5, there four receive antennas, A1-A4. The multiple receive antennas may be used selectively to create receive beam forming. Receive beam forming may be used advantageously to increase the receive antenna gain for the direction(s) on which desired signals are received, and to suppress interference from neighboring cells, provided of course that the interference is received along different directions than the desired signals.

Some aspects of the embodiments are directed to achieving fast Rx beam refinement, in which the Rx beam direction is dynamically adjusted in response to the channel conditions, in a timely manner. Embodiments of these aspects may be applicable to downlink, as well as uplink, transmissions.

In one type of embodiment, a new type of reference signal, a beam-refinement reference signal (BRRS), is provided. A BRRS is produced for transmission on the same Tx beam as data to be transmitted. The BRRS is to be transmitted just prior to the data, which may be sent via the physical downlink shared channel (PDSCH) or physical uplink shared channel (PUSCH). The BRRS transmission structure according to this type of embodiment enables the receiver to refine its Rx beam to optimize, or realize improvement in, reception of the data transmission to follow.

Advantageously, the BRRS, and its close temporal positioning relative to the data OFDM symbols that follow, establish an association between the BRRS and the data to be transmitted on the same Tx beam. In one embodiment, the start of the data symbols is within 25 ms of the BRRS. In another embodiment, the start of data symbols is within 13 ms of the BRRS. In another embodiment, the start of the data symbols is within 6 ms of the BRRS.

After Rx-beam refinement, the receiver can use that selected Rx beam immediately for reception of the following data. By comparison, conventional techniques that rely on a Tx/Rx beam pair search that measures the periodic BRS, or aperiodic CSI-RS or sounding RS (SRS), lack the association of beam-related reference signal and the data, and consequently lack the ability to conduct flexible, dynamic Rx beam refinement for data reception.

In a related embodiment, the CSI-RS may be included between the BRRS and the data. This arrangement allows the receiver to measure the channel quality based on the CSI-RS using the Rx beam refined using the preceding BRRS to improve the reception quality.

Figure 6:
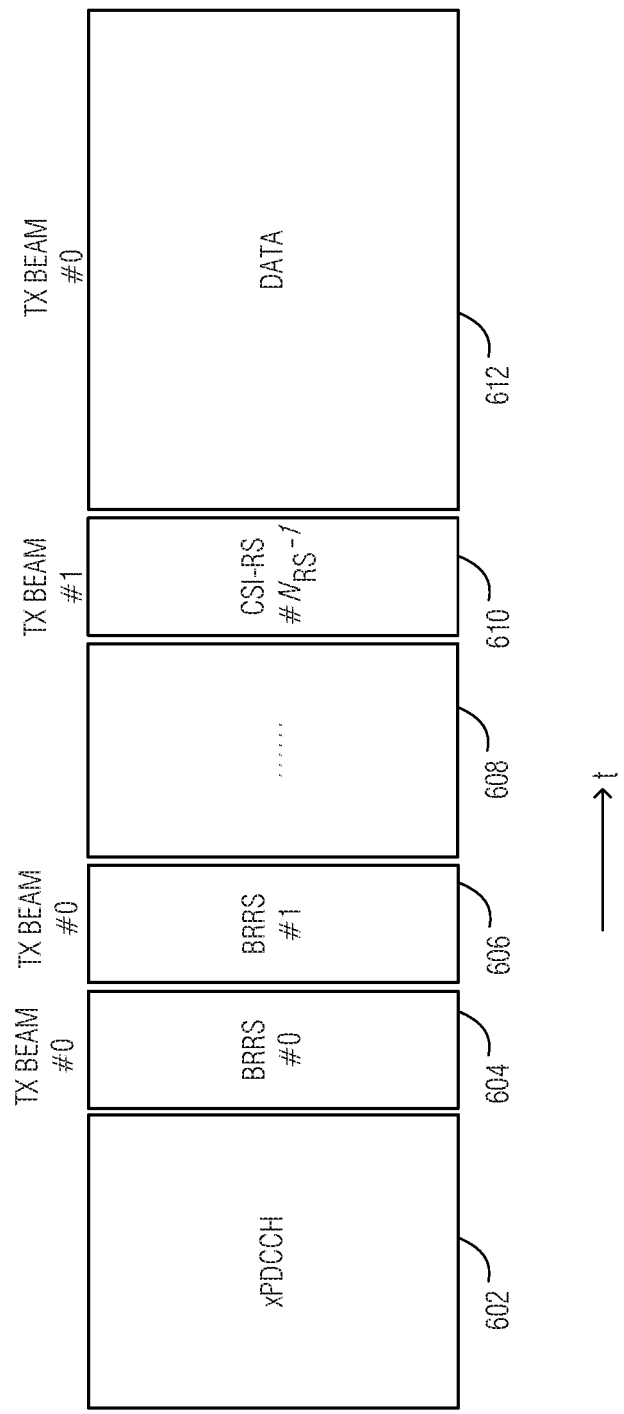
FIG. 6 is a timing diagram illustrating an example transmission structure for a downlink transmission according to some embodiments.

FIG. 6 is a timing diagram illustrating an example transmission structure for a downlink transmission according to some embodiments. The transmission structure is shown relative to timeline t. As depicted, the following items are generated for transmission in order: the control information via a PDCCH, such as an extended-PDCCH (xPDCCH) for use in the high-frequency band; a first BRRS (#0) at 604; a second BRRS (#1) at 606; additional BRRSs, if configured by the transmitter, at 608; a CIS-RS (containing NRS symbols) at 610, and data at 612, comprising multiple OFDM symbols.

Notably, BRRS #0 at 604 and BRRS #1 at 606 are each to be transmitted on the same transmission beam on which the data is to be transmitted at 612. The CSI-RS at 610 may be transmitted on the same, or on a different, transmission beam. In the example illustrated, BRRS #0 604 and BRRS #1, as well as data 612 are transmitted on transmission beam #0, whereas the CSI-RS at 610 is transmitted on transmission beam #1.

For each BRRS 604, 606, 608, the Zadoff-Chu sequence may be utilized for sequence generation:

$$a_{(n)} = \exp\left[-\frac{j2\pi un(n+1)/2}{N_{ZC}}\right],$$

where $N_{ZC}$ is selected to be largest prime number smaller than or equal to the sequence length, and u, or the root index, is indicated by the cell ID, virtual cell ID or BRS-group ID. Further, the cyclic shift (CS) value may be defined as a function of UE C-RNTI or a configured value signaled in the DCI format or Tx antenna port index.

In another embodiment, a quadrature phase shift keying (QPSK) based sequence may be used to generate the BRRS, which may be generated based on the cell ID, virtual cell ID or beamforming reference signal (BRS) ID or BRS-group ID, or symbol index, or slot index, or subframe index, or frame index, for example.

In a related embodiment, CSI-RS 610 is transmitted after the data 612. In another related embodiment, other information, such as control information, may be transmitted between the BRRS transmissions and the data. Likewise, in a related embodiment, other information may be transmitted between xPDCCH 602 and the first BRRS at 604.

In an uplink case, a similar ordering and association may be utilized between the BRRS and the data, namely, that the BRRS precedes the data, and both are to be transmitted on the same beam. It will be understood that in the uplink case, the physical uplink shared channel (PUSCH) and the physical uplink control channel (PUCCH) are utilized, and that the SRS is used rather than the CSI-RS.

In some embodiments, an indicator (which may be a 1-bit indicator) is configured by downlink control information (DCI) or by the higher layers via master information broadcasting (MIB), system information broadcasting (SIB) or radio resource configuration (RRC) signaling. The indicator is utilized to indicate whether or not the BRRSs or CSI-RSs are transmitted together with the OFDM data symbols, where a value of 0 may signify that only data OFDM symbols are transmitted, and 1 may signify that configurable RSs are transmitted together with data.

In a related embodiment, if the configurable RS transmission is enabled, certain corresponding parameters may be configured. For example, the BRRS sequence related parameters may be configured in upper layer signaling via MIB, SIB or RRC signaling. Further, some or all of the parameters listed below may be predefined or dynamically signaled in the DCI format for uplink grant and downlink assignment.
  The number of Tx ports for BRRS and the Tx port index;
  The resource mapping type to indicate whether the sequence is localized or frequency-interleaved;
  The starting index of resource element or resource block or sub-band index used for the transmission of BRRS;
  The sequence length;
  The number of OFDM symbols for each of the RSs;

In an embodiment, the above parameters for both BRRS and CSI-RSs are configured using the same upper layer configuration, except that the number of OFDM symbols can be zero for CSI-RS symbols (e.g., in the zero-power CSI-RS case where the resource element allocated to the zero-power CSI-RS is used as a spacer).

Figure 7:
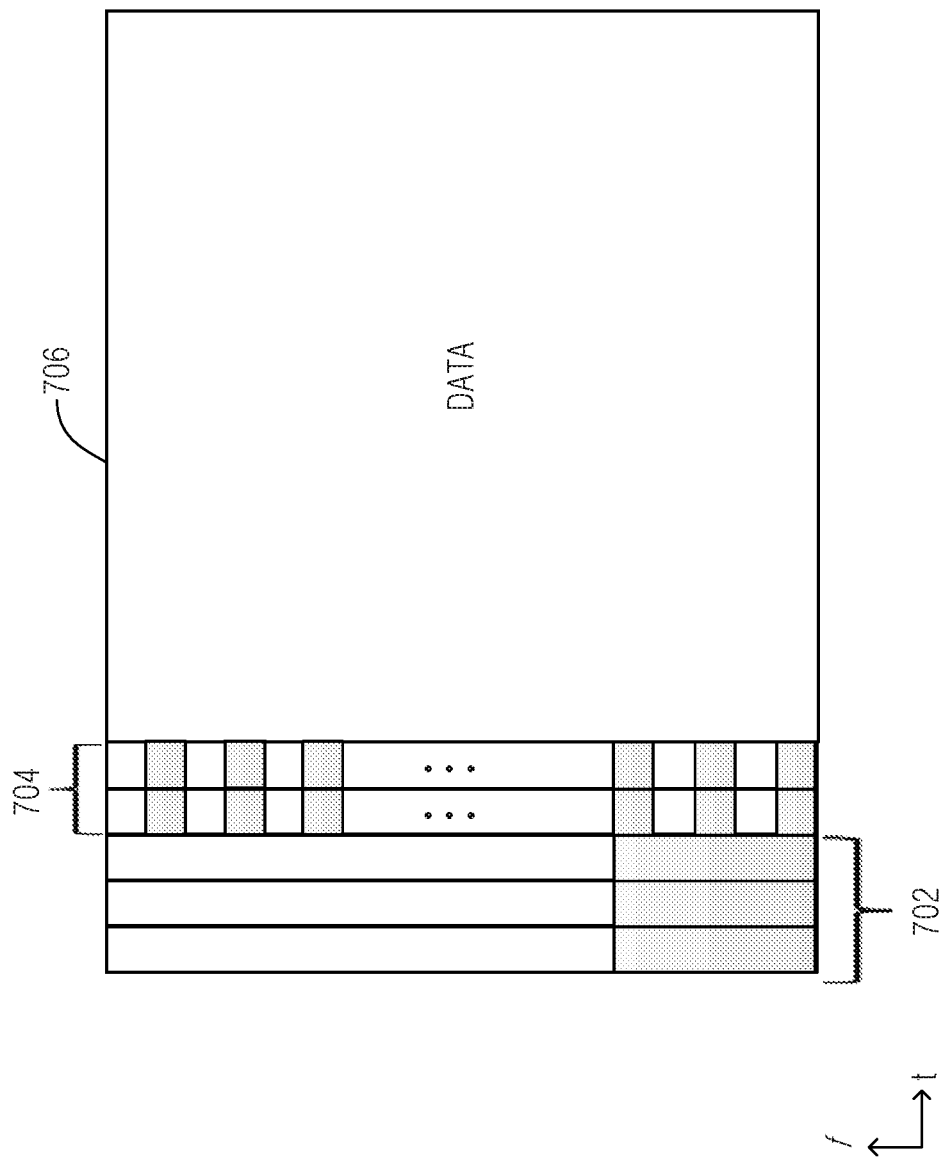
FIG. 7 is a time-frequency diagram illustrating localized and interleaved resource elements, which may be used for the reference signals according to various embodiments.

In another embodiment, the configuration for BRRS and CSI-RS can be different. For instance, in one such embodiment, a hybrid configuration is employed, in which the BRRS is configured as localized transmissions, whereas the CSI-RS is configured as frequency-interleaved transmissions. FIG. 7 is a time-frequency diagram illustrating localized and interleaved resource elements, which may be used for the BRRS or the CSI-RS signals according to various embodiments. In FIG. 7, time t is represented the horizontal axis and frequency f is represented on the vertical axis. In the example depicted, sequential BRRSs 702 are transmitted in sequential OFDM symbols, using contiguous subcarriers. Sequential CSI-RSs 704 are transmitted in sequential subframes using frequency-interleaved subcarriers. In related embodiments, the BRRSs may be frequency interleaved, and the CSI-RSs may be localized.

In a related embodiment, the CSI-RS symbols may be configured as zero power CSI-RS to serve as a gap between BRRS and data OFDM symbols.

In another related embodiment, other physical layer signals/channels may be inserted between BRRS/CSI-RSs and data OFDM symbols may start from the next subframe.

Figure 8:
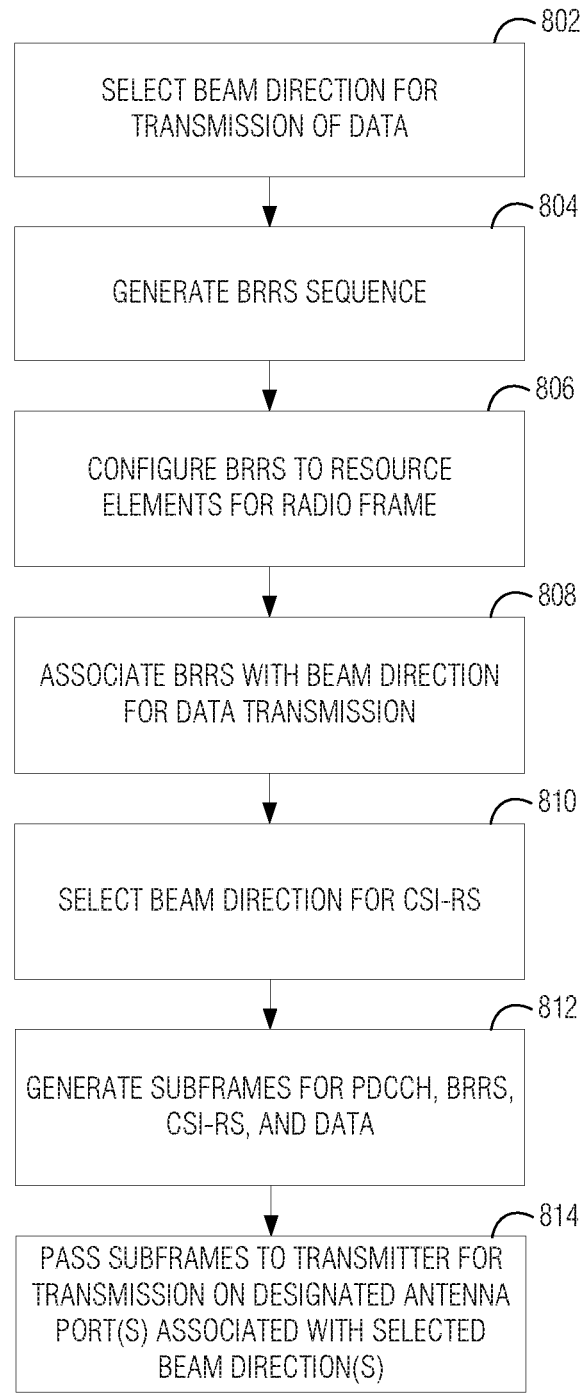
FIG. 8 is a flow diagram illustrating operations performed on a transmitter-side baseband processor to provide reference signaling in support of dynamic, real-time receive-beam refinement according to some embodiments.

FIG. 8 is a flow diagram illustrating operations performed on a transmitter-side baseband processor to provide reference signaling in support of dynamic, real-time receive-beam refinement according to some embodiments. In the present context, real-time beam refinement means that the receiver is able to adjust its Rx beam to increase the receive gain for reception of data to be transmitted on a particular Tx beam in advance of the arrival of that data.

The example depicted in FIG. 8 applies to operations performed at an eNB for the downlink transmission, though it will be understood that similar principles are applicable for the uplink case where a UE is the transmitter-side.

At 802, the beam direction for data transmission is selected. The selection may be based on previously-reported signal-reception quality for one or more beam directions by the recipient of the data, for example. At 804, the BRRS sequence is generated. At 806, the BRRS is configured to resource elements of the radio frame. The resource elements may be either localized, or interleaved with other resource elements in the frequency domain. At 808, in some embodiments, the BRRS is associated with the selected beam direction to be used for data transmission. An indicator representing this association may be passed to the transmitter circuitry to control the beam direction for the BRRS and ensure that it is sent using the same beam as the data to follow.

At 810 the beam direction for the CSI-RS is selected. As described above, this direction may be the same Tx beam direction as the one being used for the DRRS transmission and data transmission, or it may be a different Tx beam direction. The selection of the same vs. different Tx beam direction and which particular Tx beam direction to use (if it is to be different) for the CSI-RS, may vary based on a Tx beamforming-optimization algorithm being carried out at the eNB. For instance, if the eNB Tx beam selection algorithm is confirming performance of a recently-selected Tx beam direction to use for the data transmission, it may select the same Tx beam as the one to be used for the BRRS and data transmissions. Otherwise, if the eNB Tx beam selection algorithm is exploring other possible Tx beam directions to find a better Tx beam, a the CSI-RS may be used to explore a potentially-better Tx beam direction without having to commit the resources to send any of the data using the exploratory Tx beam.

At 812, the subframes for the PDCCH the BRRS, the CSI-RS, and the data symbols, are generated. At 814, the generated subframes are passed to the transmitter circuitry for transmission on the designated antenna port (or ports) that are associated with the selected beam direction(s).

On the receiver side, different operations are performed in response to the reference signals according to some embodiments. In an embodiment, in response to identification of a BRRS transmission, the Rx beam direction is varied while receiving the BRRS transmissions. Also, as the BRRS transmissions are being received on the varied Rx beams, the receive signal performance is measured. Any suitable reception performance measurement may be used, such as RSRP, RSRQ, etc., according to various embodiments. Based on the receive signal performance measurements using the varied Rx beams, the receiver determines the best available Rx beam. The operations of varying the Rx beam direction while receiving the BRRS to find the best-available Rx beam are denoted Rx beam refinement in the present context.

In an example embodiment, a maximization algorithm is applied to perform the beam refinement operations. For instance, the Rx beam may be varied based on the preceding reception performance measurement results such that the Rx beam direction is varied incrementally in a variation direction that tends to increase the performance measure, with is also the variation direction opposite that which tends to decrease the performance measure. In such a manner, an Rx beam direction that corresponds to the maximum-observed performance measure may be found.

The best-available Rx beam determined via the refinement operations is used to receive the CSI-RS, and perform channel quality measurement based thereupon. Additionally, the best-available Rx beam is used to receive the data transmission, which closely follows the BRRS.

Figure 9:
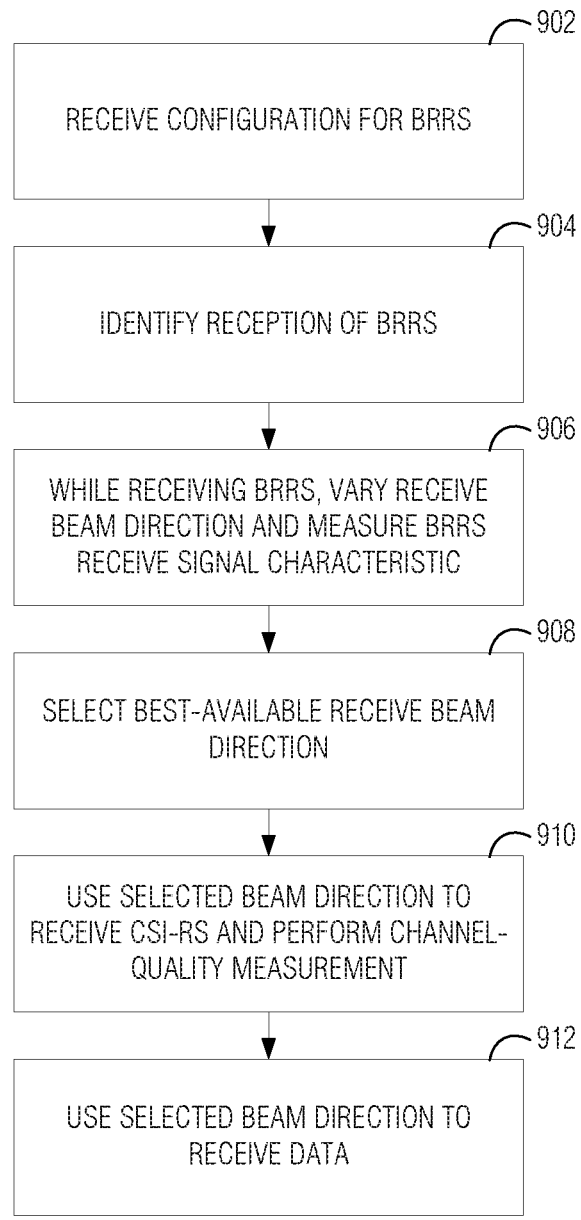
FIG. 9 is a process flow diagram illustrating an example receive-side process for refining the Rx beam direction according to some embodiments.

FIG. 9 is a process flow diagram illustrating an example receive-side process for refining the Rx beam direction according to some embodiments. The process may be carried out by a baseband processor of a UE, for example In another example, the process may be carried out by the eNB when receiving information from a UE. As illustrated in the particular example shown in FIG. 9, the process is performed by a UE in the downlink scenario, though it will be understood that, with suitable variation (e.g., the use of SRS in place of CSI-RS), the process may be adapted for use in the uplink scenario, to be carried out at the eNB.

At 902, the UE receiver receives the configuration information for the BRSS. This operation may include receiving parameters that define the resource mapping type for the BRSS, the starting index of resource element or resource block or sub-band index used for the transmission of BRRS, the sequence length, the number of OFDM symbols, etc. At 904, the receiver identifies reception of the BRSS. Identification of the reception may be achieved in response to a receive signal correlation result indicating recognition of the BRRS as it is being received, according to an embodiment. In another embodiment, identification of the BRRS reception may be based on a priori knowledge by the receiver of the resource element on which the BRRS is expected.

At 906, the Rx beam refinement takes place. Accordingly, while receiving the BRRS, the receive beam direction is varied and the performance of the BRRS reception is monitored. The variation of the Rx beam direction may itself be responsive to trends recognized in the BRRS reception performance measurements.

At 908, the best-available Rx beam direction is selected. At 910, the selected Rx beam direction is used to receive the CSI-RS and to perform the channel-quality measurements thereupon, to be reported back to the eNB. At 912, the selected Rx beam direction is used to receive the data.

In some embodiments, the number of CSI-RS symbols are blindly detected between zero and non-zero values. Based on the refined Rx beam from BRRS, the receiver can attempt to calculate the cross-correlation between the received signal and the local CSI-RS sequence, and determine whether this symbol is a CSI-RS or data according to the peak value of the cross-correlation.

In another embodiment, the sequence length of BRRS may not need to be configured, since it may occupy the same bandwidth as data. Receiver can directly obtain the sequence length according to the DCI for data assignment.

In another embodiment, the CSI report related parameter may be configured at the same time, if the CSI-RS is assigned for channel quality measurement for the downlink transmission.

In another related embodiment, the BRRS can be utilized as demodulation reference sequence (DMRS) for the data symbols that follow the DRRS. The DMRS configuration may be indicated in the DCI which can include information like the precoding information between BRRS and DMRS.

ADDITIONAL NOTES AND EXAMPLES

Example 1 is apparatus of user equipment (UE) configured for receive beamforming, the apparatus comprising: memory; and processing circuitry to control the apparatus to: identify reception of a beam refinement reference signal (BRRS) that is transmitted with a same transmit beam direction on which data is to be transmitted; during reception of the BRRS, vary receive beam direction and measure a signal characteristic of the BRRS to find a refined receive beam direction; and use the refined receive beam direction to receive the data.

In Example 2, the subject matter of Example 1 optionally includes wherein the signal characteristic is a received signal level.

In Example 3, the subject matter of Example 2 optionally includes wherein the received signal level is a measured value selected from the group consisting of received signal strength indication (RSSI), reference signal received power (RSRP), and reference signal received quality (RSRQ).

In Example 4, the subject matter of any one or more of Examples 1-3 optionally include wherein the processing circuitry is further configured to: decode a channel state information reference signal (CSI-RS) using the refined receive beam direction.

In Example 5, the subject matter of Example 4 optionally includes wherein the CSI-RS is received on a same transmit beam direction on which the BRRS is transmitted.

In Example 6, the subject matter of Example 4 optionally include wherein the CSI-RS is received on a different transmit beam direction than the transmit beam direction on which the BRRS is transmitted.

In Example 7, the subject matter of any one or more of Examples 4-6 optionally include wherein the CSI-RS is received in a subframe after the BRRS and before any of the data.

In Example 8, the subject matter of any one or more of Examples 4-6 optionally include wherein the CSI-RS is received in a subframe after the data.

In Example 9, the subject matter of any one or more of Examples 1-8 optionally include wherein the BRRS includes a plurality of BRRS sequences in successive orthogonal frequency division multiplexing (OFDM) symbols.

In Example 10, the subject matter of any one or more of Examples 1-9 optionally include wherein the BRRS includes a plurality of BRRS sequences in a set of contiguous subcarriers.

In Example 11, the subject matter of any one or more of Examples 1-9 optionally include wherein the BRRS includes a plurality of BRRS sequences in a set of non-contiguous interleaved subcarriers.

In Example 12, the subject matter of any one or more of Examples 1-11 optionally include wherein the BRRS includes a sequence based on a Zadoff-Chu sequence based on at least one parameter selected from the group consisting of: cell ID, virtual cell ID, Beamformed Reference Signal (BRS) ID, BRS group ID, or any combination thereof.

In Example 13, the subject matter of any one or more of Examples 1-11 optionally include wherein the BRRS includes a sequence based on a quadrature phase shift keying sequence based on at least one parameter selected from the group consisting of: cell ID, virtual cell ID, Beamformed Reference Signal (BRS) ID, BRS group ID, or any combination thereof.

In Example 14, the subject matter of any one or more of Examples 1-13 optionally include wherein the BRRS is received following a physical downlink control channel (PDCCH) subframe.

In Example 15, the subject matter of any one or more of Examples 1-14 optionally include wherein the refined receive beam direction is determined based on a maximization algorithm that varies the receive beam direction in response to the signal characteristic measurement.

In Example 16, the subject matter of any one or more of Examples 1-15 optionally include wherein the BRRS is used as a demodulation reference sequence (DMRS) to demodulate the data.

In Example 17, the subject matter of any one or more of Examples 1-16 optionally include wherein the processing circuitry is configured to identify reception of the BRRS based on a signal correlation of the BRRS.

In Example 18, the subject matter of any one or more of Examples 1-17 optionally include wherein the processing circuitry is to identify reception of the BRRS based on a priori knowledge of resource elements on which the BRRS is to be transmitted.

Optionally, the apparatus of the subject matter of any one or more of Examples 1-18 may further include transceiver circuitry electrically coupled to a plurality of antenna elements. In a related example, the processing circuitry of the subject matter of any one or more of Examples 1-18 comprises a baseband processor.

Example 19 is a non-transitory computer-readable medium comprising instructions that, when executed by processing circuitry of an apparatus of user equipment (UE), cause the apparatus to: identify reception of a beam refinement reference signal (BRRS) that is transmitted with a same transmit beam direction on which data is to be transmitted; during reception of the BRRS, vary receive beam direction and measure a signal characteristic of the BRRS to find a refined receive beam direction; and use the refined receive beam direction to receive the data.

In Example 20, the subject matter of Example 19 optionally includes wherein the signal characteristic is a received signal level.

In Example 21, the subject matter of Example 20 optionally includes wherein the received signal level is a measured value selected from the group consisting of received signal strength indication (RSSI), reference signal received power (RSRP), and reference signal received quality (RSRQ).

In Example 22, the subject matter of any one or more of Examples 19-21 optionally include wherein the instructions are to further cause the apparatus to: decode a channel state information reference signal (CSI-RS) using the refined receive beam direction.

In Example 23, the subject matter of Example 22 optionally includes wherein the instructions are to further cause the apparatus to receive the CSI-RS on a same transmit beam direction on which the BRRS is transmitted.

In Example 24, the subject matter of Example 22 optionally includes wherein the instructions are to further cause the apparatus to receive the CSI-RS on a different transmit beam direction than the transmit beam direction on which the BRRS is transmitted.

In Example 25, the subject matter of any one or more of Examples 22-24 optionally include wherein the instructions are to further cause the apparatus to receive the CSI-RS in a subframe after the BRRS and before any of the data.

In Example 26, the subject matter of any one or more of Examples 22-24 optionally include wherein the instructions are to further cause the apparatus to receive the CSI-RS in a subframe after the data.

In Example 27, the subject matter of any one or more of Examples 19-26 optionally include wherein the BRRS includes a plurality of BRRS sequences in successive orthogonal frequency division multiplexing (OFDM) symbols.

In Example 28, the subject matter of any one or more of Examples 19-27 optionally include wherein the BRRS includes a plurality of BRRS sequences in a set of contiguous subcarriers.

In Example 29, the subject matter of any one or more of Examples 19-27 optionally include wherein the BRRS includes a plurality of BRRS sequences in a set of non-contiguous interleaved subcarriers.

In Example 30, the subject matter of any one or more of Examples 19-29 optionally include wherein the BRRS includes a sequence based on a Zadoff-Chu sequence based on at least one parameter selected from the group consisting of: cell ID, virtual cell ID, Beamformed Reference Signal (BRS) ID, BRS group ID, or any combination thereof.

In Example 31, the subject matter of any one or more of Examples 19-29 optionally include wherein the BRRS includes a sequence based on a quadrature phase shift keying sequence based on at least one parameter selected from the group consisting of: cell ID, virtual cell ID, Beamformed Reference Signal (BRS) ID, BRS group ID, or any combination thereof.

In Example 32, the subject matter of any one or more of Examples 19-31 optionally include wherein the instructions are to further cause the apparatus to receive the BRRS following a physical downlink control channel (PDCCH) subframe.

In Example 33, the subject matter of any one or more of Examples 19-32 optionally include wherein the refined receive beam direction is determined based on a maximization algorithm that varies the receive beam direction in response to the signal characteristic measurement.

In Example 34, the subject matter of any one or more of Examples 19-33 optionally include wherein the BRRS is used as a demodulation reference sequence (DMRS) to demodulate the data.

In Example 35, the subject matter of any one or more of Examples 19-34 optionally include wherein the instructions are to further cause the apparatus to identify reception of the BRRS based on a signal correlation of the BRRS.

In Example 36, the subject matter of any one or more of Examples 19-35 optionally include wherein the instructions are to further cause the apparatus to identify reception of the BRRS based on a priori knowledge of resource elements on which the BRRS is to be transmitted.

Example 37 is apparatus of an evolved node-B (eNB) configured for transmit beamforming, the apparatus comprising: memory; and processing circuitry to control the apparatus to: select a transmit beam direction for transmission of data symbols; encode a beam refinement reference signal (BRRS) to be transmitted with the beam direction on which the data symbols are to be transmitted; and configure the BRRS to resource elements of a radio frame for transmission.

In Example 38, the subject matter of Example 37 optionally includes wherein the processing circuitry is further configured to: encode a channel state information reference signal (CSI-RS) to be transmitted.

In Example 39, the subject matter of Example 38 optionally includes wherein the processing circuitry is to encode the CSI-RS to be transmitted on a same transmit beam direction on which the BRRS is to be transmitted.

In Example 40, the subject matter of Example 38 optionally includes wherein the processing circuitry is to encode the CSI-RS to be transmitted on a different transmit beam direction than the transmit beam direction on which the BRRS is to be transmitted.

In Example 41, the subject matter of any one or more of Examples 38-40 optionally include wherein the processing circuitry is to encode the CSI-RS to be transmitted in a subframe after the BRRS and before any of the data.

In Example 42, the subject matter of any one or more of Examples 38-40 optionally include wherein the processing circuitry is to encode the CSI-RS to be transmitted in a subframe after the data.

In Example 43, the subject matter of any one or more of Examples 37-42 optionally include wherein the BRRS includes a plurality of BRRS sequences in successive OFDM symbols.

In Example 44, the subject matter of any one or more of Examples 37-43 optionally include wherein the BRRS includes a plurality of BRRS sequences in a set of contiguous subcarriers.

In Example 45, the subject matter of any one or more of Examples 37-43 optionally include wherein the BRRS includes a plurality of BRRS sequences in a set of non-contiguous interleaved subcarriers.

In Example 46, the subject matter of any one or more of Examples 37-45 optionally include wherein the BRRS includes a sequence based on a Zadoff-Chu sequence based on at least one parameter selected from the group consisting of: cell ID, virtual cell ID, Beamformed Reference Signal (BRS) ID, BRS group ID, or any combination thereof.

In Example 47, the subject matter of any one or more of Examples 37-45 optionally include wherein the BRRS includes a sequence based on a quadrature phase shift keying sequence based on at least one parameter selected from the group consisting of: cell ID, virtual cell ID, Beamformed Reference Signal (BRS) ID, BRS group ID, or any combination thereof.

In Example 48, the subject matter of any one or more of Examples 37-47 optionally include wherein the processing circuitry is to encode the BRRS for transmission following a physical downlink control channel (PDCCH) subframe.

In a related example, in the subject matter of any one or more of Examples 37-47, the processing circuitry comprises a baseband processor. In a related example, the apparatus according to the subject matter of any one or more of Examples 37-47 further comprises transceiver circuitry electrically coupled to a plurality of antenna elements.

Example 49 is a non-transitory computer-readable medium comprising instructions that, when executed by processing circuitry of an apparatus of an evolved node-B (eNB), cause the apparatus to: select a transmit beam direction for transmission of data symbols; encode a beam refinement reference signal (BRRS) to be transmitted with the beam direction on which the data symbols are to be transmitted; and configure the BRRS to resource elements of a radio frame for transmission.

In Example 50, the subject matter of Example 49 optionally includes wherein the instructions are to further cause the apparatus to: encode a channel state information reference signal (CSI-RS) to be transmitted.

In Example 51, the subject matter of Example 50 optionally includes wherein the instructions are to further cause the apparatus to encode the CSI-RS to be transmitted on a same transmit beam direction on which the BRRS is to be transmitted.

In Example 52, the subject matter of Example 50 optionally includes wherein the instructions are to further cause the apparatus to encode the CSI-RS to be transmitted on a different transmit beam direction than the transmit beam direction on which the BRRS is to be transmitted.

In Example 53, the subject matter of any one or more of Examples 50-52 optionally include wherein the processing circuitry is to encode the CSI-RS to be transmitted in a subframe after the BRRS and before any of the data.

In Example 54, the subject matter of any one or more of Examples 50-52 optionally include wherein the processing circuitry is to encode the CSI-RS to be transmitted in a subframe after the data.

In Example 55, the subject matter of any one or more of Examples 49-54 optionally include wherein the BRRS includes a plurality of BRRS sequences in successive OFDM symbols.

In Example 56, the subject matter of any one or more of Examples 49-55 optionally include wherein the BRRS includes a plurality of BRRS sequences in a set of contiguous subcarriers.

In Example 57, the subject matter of any one or more of Examples 49-55 optionally include wherein the BRRS includes a plurality of BRRS sequences in a set of non-contiguous interleaved subcarriers.

In Example 58, the subject matter of any one or more of Examples 49-57 optionally include wherein the BRRS includes a sequence based on a Zadoff-Chu sequence based on at least one parameter selected from the group consisting of: cell ID, virtual cell ID, Beamformed Reference Signal (BRS) ID, BRS group ID, or any combination thereof.

In Example 59, the subject matter of any one or more of Examples 49-57 optionally include wherein the BRRS includes a sequence based on a quadrature phase shift keying sequence based on at least one parameter selected from the group consisting of: cell ID, virtual cell ID, Beamformed Reference Signal (BRS) ID, BRS group ID, or any combination thereof.

In Example 60, the subject matter of any one or more of Examples 49-59 optionally include wherein the processing circuitry is to encode the BRRS for transmission following a physical downlink control channel (PDCCH) subframe.

Example 61 is apparatus of user equipment (UE) configured for receive beamforming, the apparatus comprising: means for identifying reception of a beam refinement reference signal (BRRS) that is transmitted with a same transmit beam direction on which data is to be transmitted; means for varying receive beam direction and measure a signal characteristic of the BRRS to find a refined receive beam direction, during reception of the BRRS; and means for using the refined receive beam direction to receive the data.

In Example 62, the subject matter of Example 61 optionally includes wherein the signal characteristic is a received signal level.

In Example 63, the subject matter of Example 62 optionally includes wherein the received signal level is a measured value selected from the group consisting of received signal strength indication (RSSI), reference signal received power (RSRP), and reference signal received quality (RSRQ).

In Example 64, the subject matter of any one or more of Examples 61-63 optionally include means for decoding a channel state information reference signal (CSI-RS) using the refined receive beam direction.

In Example 65, the subject matter of Example 64 optionally includes wherein the CSI-RS is received on a same transmit beam direction on which the BRRS is transmitted.

In Example 66, the subject matter of Examples 64 optionally includes wherein the CSI-RS is received on a different transmit beam direction than the transmit beam direction on which the BRRS is transmitted.

In Example 67, the subject matter of any one or more of Examples 64-66 optionally include wherein the CSI-RS is received in a subframe after the BRRS and before any of the data.

In Example 68, the subject matter of any one or more of Examples 64-66 optionally include wherein the CSI-RS is received in a subframe after the data.

In Example 69, the subject matter of any one or more of Examples 61-68 optionally include wherein the BRRS includes a plurality of BRRS sequences in successive orthogonal frequency division multiplexing (OFDM) symbols.

In Example 70, the subject matter of any one or more of Examples 61-69 optionally include wherein the BRRS includes a plurality of BRRS sequences in a set of contiguous subcarriers.

In Example 71, the subject matter of any one or more of Examples 61-69 optionally include wherein the BRRS includes a plurality of BRRS sequences in a set of non-contiguous interleaved subcarriers.

In Example 72, the subject matter of any one or more of Examples 61-71 optionally include wherein the BRRS includes a sequence based on a Zadoff-Chu sequence based on at least one parameter selected from the group consisting of: cell ID, virtual cell ID, Beamformed Reference Signal (BRS) ID, BRS group ID, or any combination thereof.

In Example 73, the subject matter of any one or more of Examples 61-71 optionally include wherein the BRRS includes a sequence based on a quadrature phase shift keying sequence based on at least one parameter selected from the group consisting of: cell ID, virtual cell ID, Beamformed Reference Signal (BRS) ID, BRS group ID, or any combination thereof.

In Example 74, the subject matter of any one or more of Examples 61-73 optionally include wherein the BRRS is received following a physical downlink control channel (PDCCH) subframe.

In Example 75, the subject matter of any one or more of Examples 61-74 optionally include wherein the refined receive beam direction is determined based on a maximization algorithm that varies the receive beam direction in response to the signal characteristic measurement.

In Example 76, the subject matter of any one or more of Examples 61-75 optionally include wherein the BRRS is used as a demodulation reference sequence (DMRS) to demodulate the data.

In Example 77, the subject matter of any one or more of Examples 61-76 optionally include means for identifying reception of the BRRS based on a signal correlation of the BRRS.

In Example 78, the subject matter of any one or more of Examples 61-77 optionally include means for identifying reception of the BRRS based on a priori knowledge of resource elements on which the BRRS is to be transmitted.

Example 79 is apparatus of an evolved node-B (eNB) configured for transmit beamforming, the apparatus comprising: means for selecting a transmit beam direction for transmission of data symbols; means for encoding a beam refinement reference signal (BRRS) to be transmitted with the beam direction on which the data symbols are to be transmitted; and means for configuring the BRRS to resource elements of a radio frame for transmission.

In Example 80, the subject matter of Example 79 optionally includes means for encoding a channel state information reference signal (CSI-RS) to be transmitted.

In Example 81, the subject matter of Example 80 optionally includes means for encoding the CSI-RS to be transmitted on a same transmit beam direction on which the BRRS is to be transmitted.

In Example 82, the subject matter of Example 80 optionally includes means for encoding the CSI-RS to be transmitted on a different transmit beam direction than the transmit beam direction on which the BRRS is to be transmitted.

In Example 83, the subject matter of any one or more of Examples 80-82 optionally include means for encoding the CSI-RS to be transmitted in a subframe after the BRRS and before any of the data.

In Example 84, the subject matter of any one or more of Examples 80-82 optionally include means for encoding the CSI-RS to be transmitted in a subframe after the data.

In Example 85, the subject matter of any one or more of Examples 79-84 optionally include wherein the BRRS includes a plurality of BRRS sequences in successive OFDM symbols.

In Example 86, the subject matter of any one or more of Examples 79-85 optionally include wherein the BRRS includes a plurality of BRRS sequences in a set of contiguous subcarriers.

In Example 87, the subject matter of any one or more of Examples 79-85 optionally include wherein the BRRS includes a plurality of BRRS sequences in a set of non-contiguous interleaved subcarriers.

In Example 88, the subject matter of any one or more of Examples 79-87 optionally include wherein the BRRS includes a sequence based on a Zadoff-Chu sequence based on at least one parameter selected from the group consisting of: cell ID, virtual cell ID, Beamformed Reference Signal (BRS) ID, BRS group ID, or any combination thereof.

In Example 89, the subject matter of any one or more of Examples 79-87 optionally include wherein the BRRS includes a sequence based on a quadrature phase shift keying sequence based on at least one parameter selected from the group consisting of: cell ID, virtual cell ID, Beamformed Reference Signal (BRS) ID, BRS group ID, or any combination thereof.

In Example 90, the subject matter of any one or more of Examples 79-89 optionally include means for encoding the BRRS for transmission following a physical downlink control channel (PDCCH) subframe.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. Apparatus of user equipment (UE) configured for receive beamforming, the apparatus comprising:
    memory; and
    processing circuitry to:
      decode downlink control information (DCI) received from a generation Node B (gNB), the DCI indicating a subframe and first beam refinement reference signal (BRRS) symbols within the subframe of a physical downlink shared channel (PDSCH) for (BRRS);
      decode the BRRS received in the first BRRS symbols of the subframe of the PDSCH to determine refined receive beam directional information for a previously determined receive beam; and
      decode second data symbols, using the refined receive beam directional information, the second data symbols received in the subframe of the PDSCH that included the BRRS, the second data symbols following the first BRRS symbols in the subframe,
    wherein the memory is configured to store the DCI.

2. The apparatus of claim 1, wherein the processing circuitry is further configured to:
    decode a channel state information reference signal (CSI-RS) using the refined receive beam directional information, the CSI-RS being received in the subframe,
    wherein the processing circuitry is configured to determine a channel estimate based on the CSI-RS for use in decoding the second data symbols, wherein the receive beam directional information is dynamically adjusted based on the channel estimate.

3. The apparatus of claim 2, wherein the CSI-RS is received on a same transmit beam direction on which the BRRS is transmitted.

4. The apparatus of claim 2, wherein the CSI-RS is received on a different transmit beam direction than the transmit beam direction on which the BRRS is transmitted.

5. The apparatus of claim 1, wherein the BRRS includes a plurality of BRRS sequences in a set of contiguous subcarriers.

6. The apparatus of claim 1, wherein the BRRS includes a plurality of BRRS sequences in a set of non-contiguous interleaved subcarriers.

7. The apparatus of claim 1, wherein the refined receive beam directional information is determined based on a maximization algorithm that varies the receive beam direction in response to a signal characteristic measurement.

8. The apparatus of claim 1, wherein the BRRS is used as a demodulation reference sequence (DMRS) to demodulate the second data symbols.

9. The apparatus of claim 1, wherein the processing circuitry is configured to identify reception of the BRRS based on a signal correlation of the BRRS.

10. The apparatus of claim 1, wherein the processing circuitry is to identify reception of the BRRS based on a priori knowledge of resource elements on which the BRRS is to be transmitted.

11. The apparatus of claim 1, wherein the processing circuitry comprises a baseband processor.

12. The apparatus of claim 1, wherein the apparatus further comprises transceiver circuitry electrically coupled to a plurality of antenna elements.

13. A non-transitory computer-readable medium comprising instructions that, when executed by processing circuitry of an apparatus of user equipment (UE), cause the apparatus to:
    decode downlink control information (DCI) received from a generation Node B (gNB), the DCI indicating a subframe and first beam refinement reference signal (BRRS) symbols within the subframe of a physical downlink shared channel (PDSCH) for (BRRS);
    decode the BRRS received in the first BRRS symbols of the subframe of the PDSCH to determine refined receive beam directional information for a previously determined receive beam; and
    decode second data symbols, using the refined receive beam directional information, the second data symbols received in the subframe of the PDSCH that included the BRRS, the second data symbols following the first BRRS symbols in the subframe.

14. The non-transitory computer-readable medium of claim 13, wherein the instructions are to further cause the apparatus to:

decode a channel state information reference signal (CSI-RS) using the refined receive beam directional information, the CSI-RS being received in the subframe; and determine a channel estimate based on the CSI-RS for use in decoding the second data symbols, wherein the receive beam directional information is dynamically adjusted based on the channel estimate.

15. The non-transitory computer-readable medium of claim 14, wherein the instructions are to further cause the apparatus to receive the CSI-RS on a same transmit beam direction on which the BRRS is transmitted.

16. The non-transitory computer-readable medium of claim 14, wherein the instructions are to further cause the apparatus to receive the CSI-RS on a different transmit beam direction than the transmit beam direction on which the BRRS is transmitted.

17. The non-transitory computer-readable medium of claim 13, wherein the BRRS includes a plurality of BRRS sequences in a set of contiguous subcarriers.

18. The non-transitory computer-readable medium of claim 13, wherein the BRRS includes a plurality of BRRS sequences in a set of non-contiguous interleaved subcarriers.

19. The non-transitory computer-readable medium of claim 13, wherein the refined receive beam directional information is determined based on a maximization algorithm that varies the receive beam direction in response to a signal characteristic measurement.

20. The non-transitory computer-readable medium of claim 13, wherein the BRRS is used as a demodulation reference sequence (DMRS) to demodulate the second data symbols.

21. The non-transitory computer-readable medium of claim 13, wherein the instructions are to further cause the apparatus to identify reception of the BRRS based on a signal correlation of the BRRS.

22. The non-transitory computer-readable medium of claim 13, wherein the instructions are to further cause the apparatus to identify reception of the BRRS based on a priori knowledge of resource elements on which the BRRS is to be transmitted.

23. Apparatus of a generation node-B (gNB) configured for transmit beamforming, the apparatus comprising:

memory; and processing circuitry to:

encode a downlink control information (DCI) for transmission to a user equipment (UE), the DCI indicating a subframe and first beam refinement reference signal (BRRS) symbols within the subframe of a physical downlink shared channel (PDSCH) for (BRRS);

encode the BRRS for transmission in the first BRRS symbols of the subframe of the PDSCH for use by the UE to determine refined receive beam directional information for a previously determined receive beam; and encode second data symbols for transmission in the subframe of the PDSCH that included the BRRS, the second data symbols following the first BRRS symbols in the subframe.

24. The apparatus of claim 23, wherein the processing circuitry is further configured to:

encode a channel state information reference signal (CSI-RS) to be transmitted in the subframe that included the BRRS.

25. The apparatus of claim 24, wherein the processing circuitry is to encode the CSI-RS to be transmitted on a same transmit beam direction on which the BRRS is to be transmitted.

26. The apparatus of claim 24, wherein the processing circuitry is to encode the CSI-RS to be transmitted on a different transmit beam direction than the transmit beam direction on which the BRRS is to be transmitted.

27. The apparatus of claim 24, wherein the processing circuitry is to encode the CSI-RS to be transmitted in the subframe after the BRRS and before the second data symbols.

28. The apparatus of claim 24, wherein the processing circuitry is to encode the CSI-RS to be transmitted in the subframe after the second data symbols.

29. The apparatus of claim 23, wherein the BRRS includes a sequence based on a Zadoff-Chu sequence based on at least one parameter selected from the group consisting of: cell ID, virtual cell ID, Beamformed Reference Signal (BRS) ID, BRS group ID, or any combination thereof.

30. The apparatus of claim 23, wherein the BRRS includes a sequence based on a quadrature phase shift keying sequence based on at least one parameter selected from the group consisting of: cell ID, virtual cell ID, Beamformed Reference Signal (BRS) ID, BRS group ID, or any combination thereof.

* * * * *